_United States Patent_ [19]

Lichtenberger et al.

[11] 4,179,399

[45] Dec. 18, 1979

[54] METHOD OF REGENERATING ADSORBENTS

[75] Inventors: Horst Lichtenberger, Oberhausen; Karl Knoblauch, Essen; Horst Grochowski, Oberhausen; Harald Jüntgen; Jürgen Schwarte, both of Essen, all of Fed. Rep. of Germany

[73] Assignee: Bergwerksverband GmbH, Essen, Fed. Rep. of Germany

[21] Appl. No.: 775,982

[22] Filed: Mar. 9, 1977

[30] Foreign Application Priority Data

Mar. 11, 1976 [DE] Fed. Rep. of Germany ....... 2610074

[51] Int. Cl.² ............................................. B01J 21/20
[52] U.S. Cl. ..................................... 252/411 S; 34/9; 55/73; 55/74; 55/79; 252/411 R; 423/244; 422/194; 422/216; 422/223
[58] Field of Search ............... 252/411 R, 411 S, 420, 252/418, 417; 423/244; 34/9; 55/73-79

[56] References Cited

U.S. PATENT DOCUMENTS

| 1,731,223 | 10/1929 | Brady | 423/244 |
|---|---|---|---|
| 3,559,296 | 2/1971 | Dratwa et al. | 34/9 |
| 4,039,290 | 8/1977 | Ihada et al. | 252/417 |

_Primary Examiner_—P. E. Konopka
_Attorney, Agent, or Firm_—Michael J. Striker

[57] ABSTRACT

A charged adsorbent is accommodated in a desorbing vessel and in an intermediate container which communicates with the desorbing vessel. The charged adsorbent is desorbed in the desorbing vessel by contacting the same with a heat carrier, such as with hot sand, and a desorption gas which develops during the desorption of the charged adsorbent in the desorbing vessel is passed through the charged adsorbent accommodated in the intermediate container to capture at least one component of the desorption gas in the charged adsorbent present in the intermediate container. The purified desorption gas is withdrawn from the intermediate container, and the regenerated adsorbent is gradually discharged from the desorbing vessel and the supply of the adsorbent in the desorbing vessel is replenished by charged adsorbent from the intermediate container. The desorption gas is cooled during the passage thereof through the charged adsorbent present in the intermediate container. The magnitude of the temperature reduction of the desorption gas may be controlled by controlling the rate at which the desorption gas is discharged from the intermediate container, such as by resorting to the use of an adjustable vane. The adsorbent in the intermediate container may be confined by gas-permeable walls through which the desorption gas enters and leaves the adsorbent present in the intermediate container.

6 Claims, 2 Drawing Figures

METHOD OF REGENERATING ADSORBENTS

BACKGROUND OF THE INVENTION

The present invention relates to a method of an apparatus for regenerating charged adsorbents, particularly activated coal charged with gaseous pollutants such as sulfur dioxide.

There have been already proposed various methods and arrangements for desorbing charged adsorbents. So, for instance, it has been proposed to regenerate or desorb charged active coal by contacting the same with a finely pulverized heat carrier which is at a temperature exceeding 500° C. In this proposed arrangement, the active coal to be regenerated is introduced into a desorbing vessel from an intermediate or an accumulating container, and the desorption gas which is liberated from the adsorbent during the thermal treatment thereof is withdrawn from the desorbing vessel and subsequently subjected to a further treatment.

This proposed method is used, and the arrangement performing such method is employed, for instance, in connection with de-sulfurizing flue gases, particularly those generated during the operation of a boiler installation of an electric generating plant. In this application, the flue gases are conducted through a body or heap of particulate or granular activated coal or activated coke. During the passage of the flue gases through such a body, sulfur dioxide as well as the present sulfur trioxide and other pollutants or impurities are adsorptionally attached to the activated coal or activated coke particles or granules and thus removed from the flue gases.

As already mentioned above, the regeneration of the charged adsorbent, such as the particulate or granular activated coal or activated coke can be achieved in a thermal manner, for instance, by contacting the charged adsorbent with a particulate heat carrier, and finely granulated or finely particulate sand can be used as the heat carrier. Experience with this method and with the operation of the apparatus employing this method has shown, however, that the desorption gas leaving the body of the adsorbent contains, in addition to water vapor, carbon dioxide and sulfur dioxide, also sulfur trioxide and dust. The two last-mentioned components of the desorption gas issuing from the body of the adsorbent render further treatment of the desorption gases difficult if not impossible.

SUMMARY OF THE INVENTION

Accordingly, it is a general object of the present invention to avoid the disadvantages of the prior art.

More particularly, it is an object of the present invention to devise a method of regenerating charged adsorbents which is not possessed of the disadvantages of the prior art methods.

It is a further object of the present invention to provide a method which renders it possible, in a simple, reliable and inexpensive manner, to remove the components of the desorption gas which render the further treatment of the latter difficult, such as sulfur trioxide and dust, from the desorption gas prior to the further treatment thereof.

A concomitant object of the present invention is to design an apparatus employing the above-mentioned method, which is simple in construction, reliable in operation and inexpensive to manufacture.

Yet another object of the present invention is to provide an apparatus which renders possible substantial elimination of noxious components from the desorption gas passing therethrough.

In pursuance of these objects and others which will become apparent hereafter, one feature of the present invention resides, briefly stated, in a method of regenerating adsorbents charged with adsorbed substances, which comprises the steps of confining a charged adsorbent in a first and in a second confining zone; heating the charged adsorbent in the first confining zone to a temperature at which the charged adsorbent is desorbed and desorption gas develops; and passing the desorption gas through the second confining zone to capture at least one component of the desorption gas in the charged adsorbent present therein. Preferably, the heating step includes mixing the charged adsorbent with a particulate heat carrier that is at a temperature exceeding the desorption temperature to form a mixed body in the first confining zone. Advantageously, the confining step includes forming a first body containing the charged adsorbent in the first confining zone, and forming a second body of the charged adsorbent in the second confining zone, said bodies being separate from one another.

The desorbed adsorbent is discharged from the first confining zone, and the charged adsorbent is conveyed from the second into the first confining zone to replenish the supply of the charged adsorbent being desorbed, and additional charged adsorbent is admitted into the second confining zone.

The temperature of the desorption gas is reduced during the passage of the desorption gas through the second confining zone. Preferably, the heating step includes contacting the charged adsorbent with a heat carrier that is at a temperature exceeding 500° C. so that the desorption gas leaves the first confining zone at a temperature of substantially 450° C. Then, the temperature of the desorption gas is reduced to about 250° C. during the passage thereof through the second confining zone.

The method of the present invention can be performed without resorting to any additional arrangements for purifying the desorption gas and can be integrated, without any difficulty, in the already existing regenerating processes. Even though the capability of the charged activated coal or similar adsorbent to adsorb sulfur dioxide is exhausted, the sulfur trioxide which is present in the desorption gases will still be adsorbed, while the sulfur dioxide content of the desorption gases remains the same. Simultaneously therewith, the activated coal body present in the second confining zone serves as a filter which captures the dust-like sand or abrasion powder.

An additional aspect of the present invention resides in an apparatus for regenerating adsorbents charged with adsorbed substances, which comprises means for confining a charged adsorbent in a first and in a second confining zone; means for heating the charged adsorbent in the first confining zone to a temperature at which the charged adsorbent is desorbed and a desorption gas develops; and means for conveying the desorption gas toward and through the second confining zone so that at least one component of the desorption gas is captured in the charged adsorbent present in the second confining zone. Preferably, the heating means includes means for contacting and mixing the charged adsorbent with a particulate heat carrier that is at a temperature exceeding the desorption temperature to form a mixed body in the first confining zone. Advantageously, the confining means includes a desorbing vessel defining the first confining zone, and an intermediate container defining the second confining zone and separate from the desorbing vessel. Then, the conveying means includes a conduit communicating the desorbing vessel and the intermediate container. In a currently preferred embodiment of the present invention, the intermediate container has an upright axis, and the conveying means further includes a discharge duct communicating with the intermediate container at an elevation higher than that at which the conduit communicates with the intermediate container.

In an advantageous, currently preferred embodiment of the present invention, the conveying means further includes at least one downwardly open hood with which the respective one of the duct and the conduit communicates. The hood may be mounted in the intermediate container for adjustment of the position thereof along the upright axis of the intermediate container. Preferably, the adjustably mounted hood communicates with the above-mentioned conduit. An arrangement according to this aspect of the present invention is rather inexpensive. The adjustability of the elevation of the adjustably mounted hood controls the contact time between the desorption gases and the body of the activated coal or similar adsorbent present in the second confining zone and, as a result of this, also the reduction of the temperature of the desorption gases leaving the body of the adsorbent present in the second confining zone.

In a slightly different modification of the present invention, the confining means includes at least one gas-permeable wall in the intermediate container which separates the second confining zone from at least one chamber. Then, the above-mentioned conduit communicates with the one chamber so that the latter forms a part of the conveying means. Advantageously, an additional gas-permeable wall is provided in the intermediate container and separates the second confining zone from another chamber, and the conveying means further includes a discharge duct communicating with the other chamber. Means may be provided for controlling the flow of the desorption gas into the discharge duct, and such controlling means may include an upwardly oriented vane accommodated in the other chamber and mounted on the intermediate container for displacement along the upright axis of the intermediate container. The controlling means, by controlling the flow of the desorption gas through the body of the charged adsorbent present in the second confining zone, also controls the temperature of the desorption gases issuing from the body of the adsorbent present in the second confining zone.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
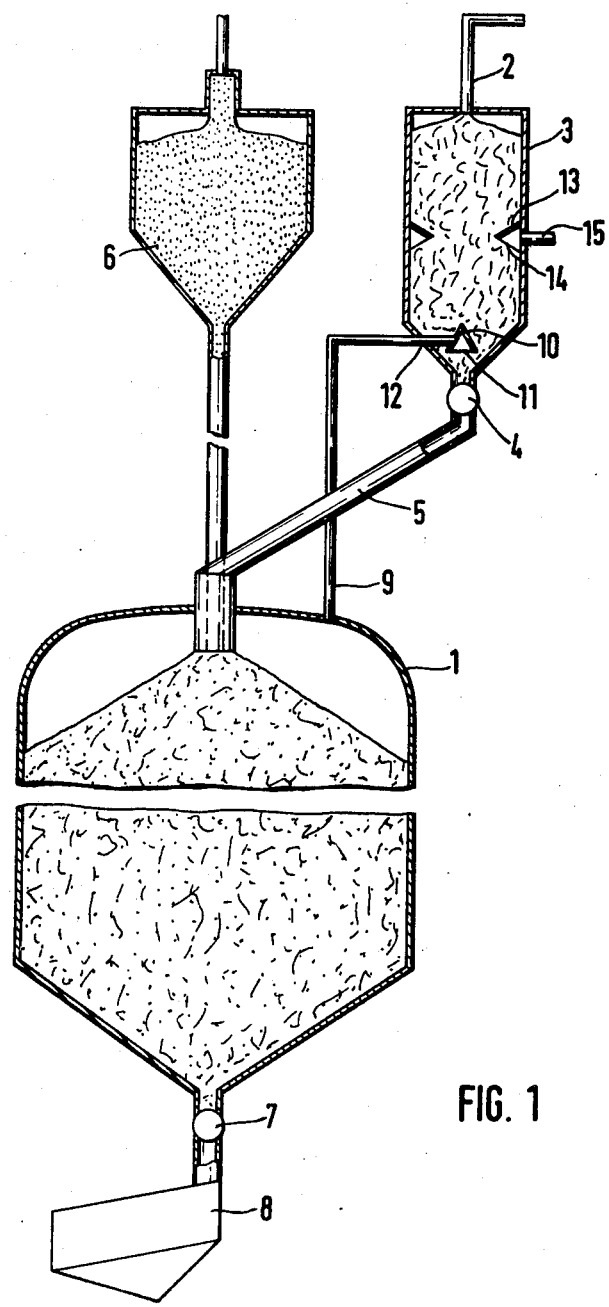
FIG. 1 is a somewhat diagrammatic sectional view of a desorbing vessel and of an intermediate container of the present invention.

Referring now to the drawing in detail, and first to FIG. 1 thereof, it may be seen that the arrangement of the present invention includes a desorbing vessel 1 in which charged activated coal or a similar adsorbent is brought together with a hot heat carrier. The charged adsorbent is derived from a non-illustrated adsorption vessel and is conveyed through a conduit 2 and introduced into an intermediate container 3 to accumulate therein. The adsorbent is withdrawn, in a controlled manner, from the intermediate container 3 by means of a discharging arrangement 4 and is forwarded through a conduit 5 into the desorbing vessel 1. The adsorbent has a temperature of between 100° and 130° C. when it is admitted into the desorbing vessel 1.

A sand of fine granulation is used as a solid heat carrier, the sand being heated in a non-illustrated sand heater to a temperature exceeding 500° C., preferably to about 700° C. The hot sand is advanced from the non-illustrated sand heater into a filling container 6 and, from there, into the desorbing vessel 1. In the desorbing vessel 1, the adsorbent and the sand are brought into an intimate contact with one another. The mixture of the adsorbent with the sand is then discharged from the interior of the adsorbing vessel through a valve 7 of a conventional construction and in a regulated manner, and the discharged mixture of adsorbent and sand is separated into its components by means of a sieve 8.

During the heating of the adsorbent by the hot sand, gaseous substances or components which have been previously adsorbed by the adsorbent, such as activated carbon, are liberated or released from their adsorptional bond to the particles of the adsorbent. Such liberated gaseous substances form a desorption gas which leaves the interior of the desorbing vessel 1 through a gas conduit 9. Subsequent to leaving the arrangement of the present invention altogether, the desorption gases may undergo further treatment, such as in a Claus arrangement.

In order to remove sulfur trioxide and dust from the desorption gases, such desorption gases are passed through the body of the adsorbent, such as activated coal, present in the interior of the intermediate container 3. As illustrated in FIG. 1, a baffle 10 or a similar structure, which is downwardly oriented, is arranged in the lower portion of the intermediate container 3. In the event that the intermediate container 3 is substantially cylindrical, the structure 10 is of a conical configuration and made of a metallic sheet material. On the other hand, if the intermediate container 3 is of a rectangular configuration or cross section, two metallic sheet members are used for the construction of the structure 10, which two members are connected to one another in such a manner that the structure 10 has a substantially roof-shaped configuration. The adsorbent slides over the structure 10 and constitutes, underneath the structure 10, an ingress surface 11. An inlet nipple 12 communicates with the space underneath the structure 10 and is connected with the gas conduit 9 through which the desorption gases are conducted.

A frusto-conical annular baffle 13 is arranged upwardly of the structure 10, the baffle 13 commencing at the circumferential wall of the intermediate container 3.

The adsorbent penetrates underneath the baffle 13, forming a sloping egress surface 14 thereat. A discharge nipple 15 communicates with the space bounded by the baffle 13 and the egress surface 14. The desorption gases which develop in the desorbing vessel 1 flow through the gas conduit 9 and the inlet nipple 12 into the intermediate container 3. Such desorption gases penetrate through the ingress surface 11 into the body of the charged adsorbent and exit from such a body through the egress surface 14. The desorption gases are purified during their passage through the body of the adsorbent, and the purified desorption gases are removed from the intermediate container 3 via the outlet nipple 15 and are subsequently subjected to further treatment.

The desorption gas, when it leaves the desorbing vessel 1, has a temperature of approximately 450° C. The desorption gases are then cooled by their contact with the adsorbent which is at a temperature of approximately 100° C. The temperature of the desorption gases withdrawn from the intermediate container 3 should be approximately 250° C. The extent of the reduction of the temperature of the desorption gases is proportional to the time during which the desorption gases are in contact with the body of the adsorbent confined in the intermediate container 3. In order to obtain the desired final temperature, the structure 10 is mounted in the interior of the intermediate container 3, in any conventional manner, for adjustment of its position in the vertical direction, while still in communication with the inlet nipple 12. The adjustment of the position of the structure 10 results in a change in the dwell time of the desorption gases in the body of the adsorbent accommodated in the interior of the intermediate container 3, and thus the temperature of the desorption gases leaving the intermediate container 3 is controlled.

Figure 2:
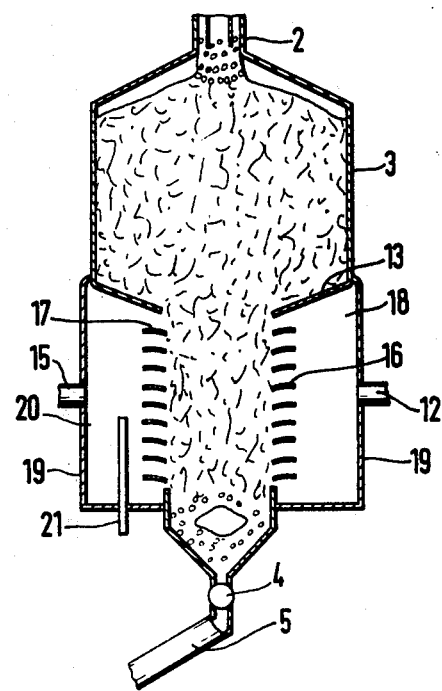
FIG. 2 is a view similar to FIG. 1 of an intermediate container only according to a modification of the present invention.

FIG. 2 illustrates a modified version of the intermediate container 3 of the present invention, in which the lower portion of the intermediate container 3 is of a reduced transverse dimension as compared to the upper portion of the intermediate container 3. The reduced portion is bounded by gas-permeable walls 16 and 17 which confine the descending column of the adsorbent between themselves. The walls 16 and 17 can be made gas-permeable in any conventional manner, for example, as illustrated, by being constructed in a manner resembling Venetian blinds. The desorption gases which enter the interior of the intermediate container 3 through the inlet nipple 12 first flow through an inlet chamber 18 which is defined by an outer wall 19 of the intermediate container 3 and the gas-permeable wall 16. The desorption gases then flow from the inlet chamber 18, transversely to the direction of movement of the adsorbent, through the body of such adsorbent from the gas-permeable wall 16 to the gas-permeable wall 17 and from the latter into an outlet chamber 20 which is defined in a manner similar to that of the inlet chamber 18. The desorption gases which have been purified during their passage through the charged adsorbent confined between the gas-permeable walls 16 and 17, are discharged from the outlet chamber 20 through the outlet nipple 15. A baffle 21 is arranged downstream of the gas-permeable wall 17 as considered in the direction of flow of the desorption gases, for instance, as illustrated, within the outlet chamber 20. The baffle 21 is upwardly oriented and is mounted in the intermediate container 3 for adjustment of the height thereof, whereby the withdrawal rate of the desorption gases from the interior of the intermediate container 3 and thus the dwell time of the desorption gases in the charged adsorbent present between the gas-permeable walls 16 and 17 and, consequently, the exit temperature of the purified desorption gases withdrawn through the outlet nipple 15, can be controlled.

It will be understood that each of the elements described above, or two or more together, may also find a useful application in other types of constructions differing from the types described above.

While the invention has been illustrated and described as embodied in an arrangement for regenerating charged adsorbents, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of regenerating an adsorbent charged with adsorbed substances, comprising the steps of confining a first and a second body of the adsorbent in separate first and second confining zones; mixing and contacting the first body of adsorbent in said first confining zone with a particulate heat carrier thereby heating the first body of the charged adsorbent to a temperature at which the charged adsorbent of the first body is desorbed and a desorption gas develops in the first confining zone; and passing the desorption gas from the first into the second confining zone and then through the second body of the charged adsorbent to capture at least one component of the desorption gas in the charged adsorbent of the second body.

2. A method as defined in claim 1 and further comprising the steps of discharging the desorbed adsorbent from the first confining zone; conveying the charged adsorbent from the second into the first confining zone to replenish the first body of the charged adsorbent and admitting additional charged adsorbent into the second confining zone.

3. A method as defined in claim 1, and further comprising the step of reducing the temperature of the desorption gas during the passage thereof through the second confining zone.

4. A method as defined in claim 3, wherein said heating step includes contacting the charged adsorbent with a heat carrier that is at a temperature exceeding 500° C. so that the desorption gas leaves the first confining zone at a temperature of substantially 450° C.; and wherein said reducing step includes lowering the temperature of the desorption gas to about 250° C.

5. A method of regenerating an adsorbent which is fully charged with at least one substance, but which still has the capacity to capture other substances, comprising the steps of confining a first and a second body of the adsorbent in separate first and second confining zones; mixing and contacting the first body of adsorbent in said first confining zone with a particulate heat carrier thereby heating the first body of the charged adsorbent to a temperature at which the charged adsorbent of the first body is desorbed and a desorption gas containing at least one of the said other substances as one component thereof develops in the first confining zone; and passing the desorption gas from the first into the second confining zone and then through the second body of the charged adsorbent to capture the said one component of the desorption gas in the charged absorbent of the second body.

6. A method as defined in claim 5 wherein said one substance is sulfur dioxide and said other substance is sulfur trioxide.

* * * * *